Feb. 22, 1966   N. H. EVANS   3,236,026
APPARATUS FOR SETTING ADHESIVE SEALING MEANS
Filed Aug. 1, 1962   5 Sheets-Sheet 5

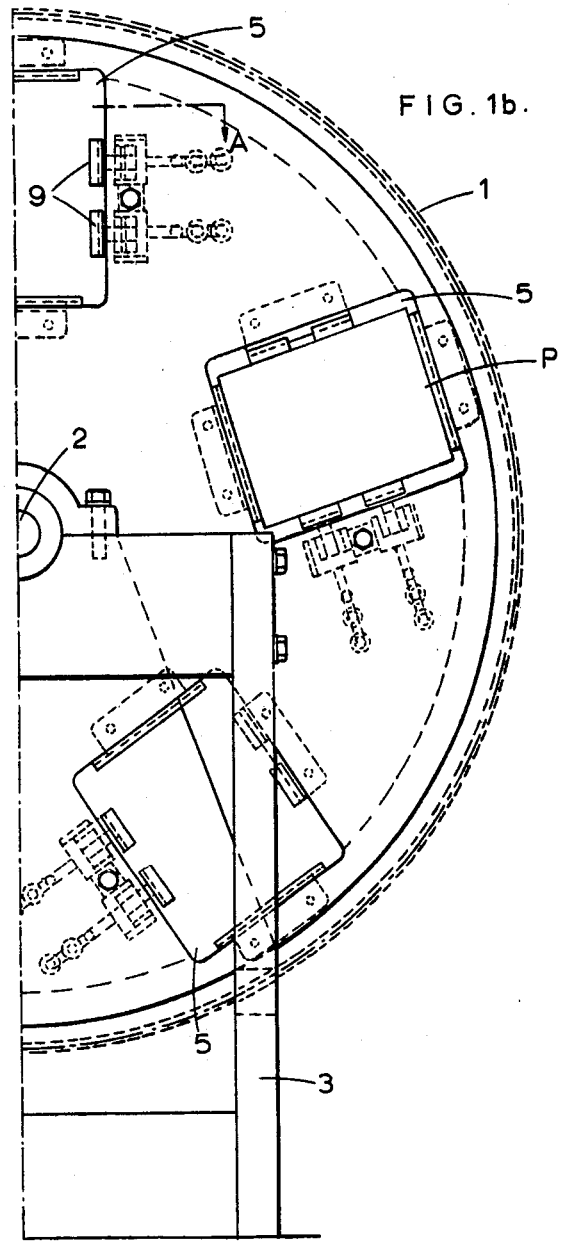

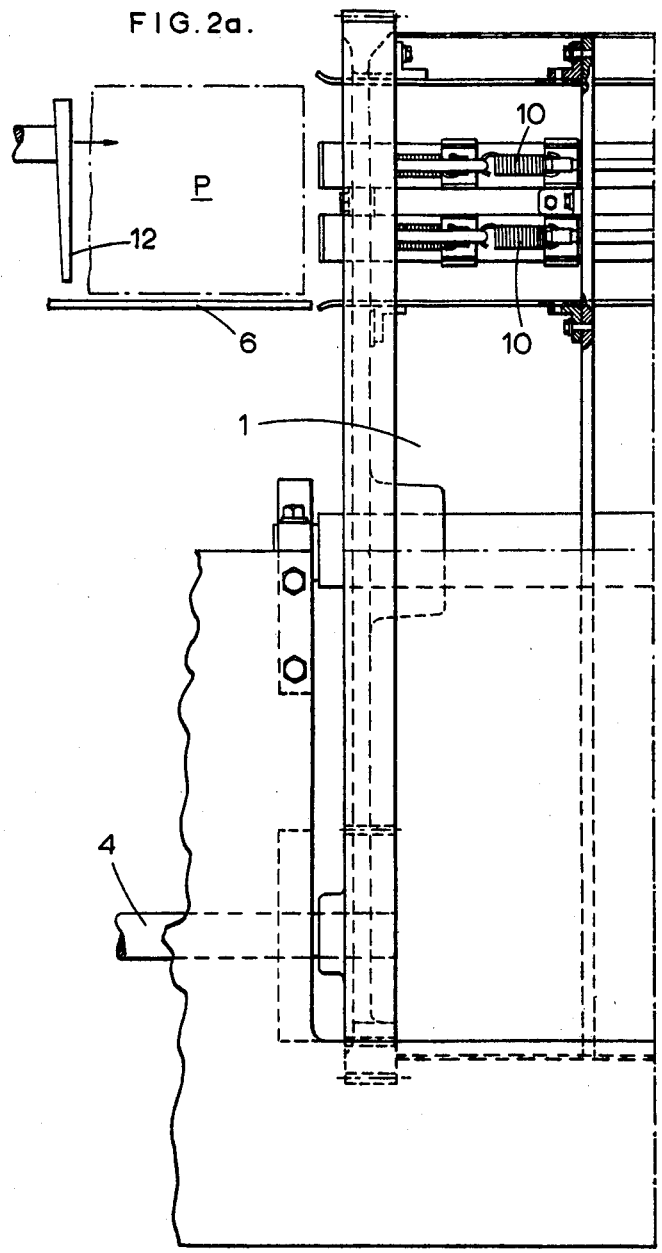

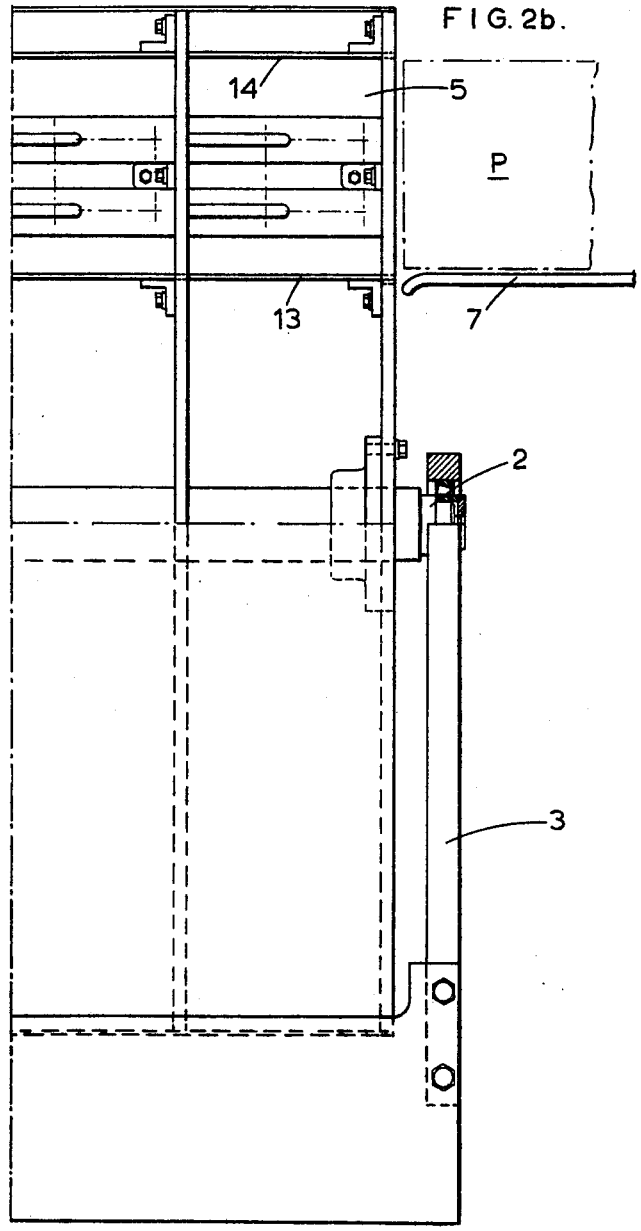

INVENTOR
Norman Harry Evans
BY
ATTORNEY

3,236,026
APPARATUS FOR SETTING ADHESIVE SEALING MEANS

Norman Harry Evans, Acton, London, England, assignor to Wix of London Limited, London, England, a British company
Filed Aug. 1, 1962, Ser. No. 214,085
3 Claims. (Cl. 53—387)

This invention relates to apparatus for drying or setting adhesive sealing means, hereinafter called seals, of cartons or other packages. The term "setting" as used hereinafter is intended to include the term "drying."

It is an object of this invention to provide a compact apparatus for setting such seals which occupies considerably less space in a factory than known apparatus of this character. Accordingly, the invention provides such an apparatus which comprises a rotatable conveyor; a plurality of setting chambers or channels which are adapted to receive packages having seals to be set, and which extend through the conveyor, and are spaced from each other around the axis of rotation of the conveyor; means for advancing packages through the said chambers or channels; and pressure members ararnged within each of the said chambers or channels to apply pressure to the surfaces of the seals to be set.

Figure 1A:
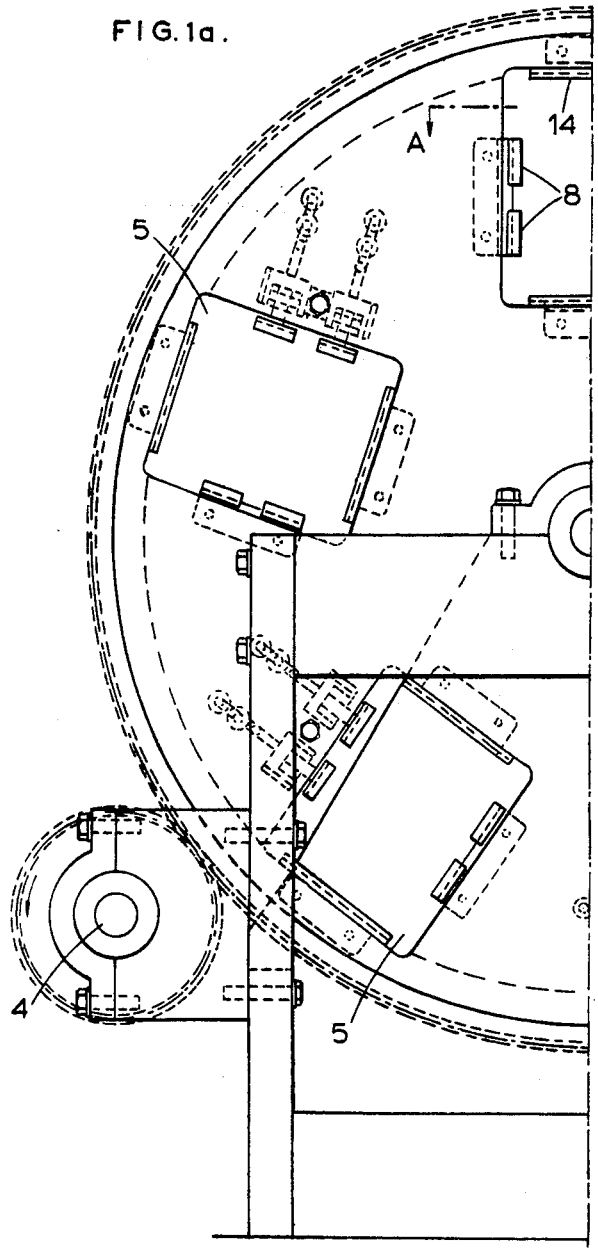

In the accompanying drawings:

FIGURES 1a and 1b together form an end view of an apparatus according to the invention.

Figure 3:
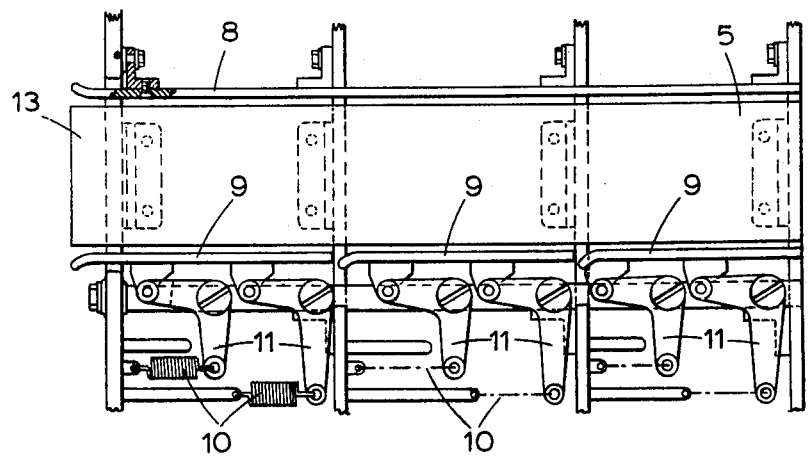

FIGURES 2a and 2b together form a side view of the same apparatus with a cover removed to show the interior of a setting channel, and FIGURE 3 is a detail view of a setting channel, and is a sectional view on line A—A of FIGURE 1.

In the illustrated embodiment of the invention, an apparatus for setting the adhesive seals of a carton or other package comprises a rotatable conveyor in the form of a cylindrical drum 1 which is intermittently rotatable on a shaft 2, conveniently by not essentially a horizontal shaft, supported in a machine frame 3. This drum is rotated by a drive from a shaft 4 rotated by an indexing mechanism (not shown). The drum 1 has a plurality of equally spaced channels 5 adapted to receive packages having seals to be set. In the illustrated embodiment there are five channels, but there can be more or fewer channels if desired. The size and shape of each channel 5 is determined by the size and shape of the packages to be handled by the apparatus and each channel is open at both ends of the drum.

The packages enter the channels at one end of the drum, hereinafter called the feed end, and leave the channels at the other end hereinafter called the discharge end. The packages are advanced, for example by a conveyor belt, to a feed plate or table 6 and are discharged from the channels 5 onto an output or take-off table 7 or onto a take-off conveyor.

Pressure members 8 and 9, the positions of which may be adjustable, are provided in each channel 5 to press against the seals of a package. These pressure members can be on one or more walls of each channel. For example, if the seals are on two opposed faces of a package the pressure members are arranged on two corresponding walls of the channels as shown in the drawings. The number of pressure members depends on the number of seals on the packages to be handled by the apparatus. The pressure members are constituted by pairs of adjustable spring loaded pressure plates or strips, each with an appropriate "lead-in" for the packages. The pressure member 8 on one side of each channel is fixed. The pressure member 9 on the opposite side of each channel is formed of separate strips each loaded by pressure springs 10 acting through bell-crank levers 11 on which the plates are mounted. The pressure members can alternatively be, for example, spring-loaded pressure rollers, spring-loaded endless bands or hydraulic or pneumatic pads. Alternatively the pressure members can have other forms; for example, they can be brushes or pads of sponge rubber or foam plastic. Guide plates 13 and 14 are provided on the walls of the channels not provided with pressure members.

Packages P to which seals have already been applied are fed to the feeding table 6 by the feed conveyor (not shown). When a channel 5 is adjacent the feeding table 6, a feed device or pusher 12 pushes a package P into the open end of the channel. The drum then rotates through 72° for the five channel drum illustrated, or through a larger or smaller angle where there are fewer or more channels, so that the next channel arrives at the feed table 6 and receives another package.

The drum 1 is filled with packages P by first inserting a package into each channel 5 as it arrives at the feed table 6. When each channel 5 arrives at the feed table 6 for the second time, a second package is inserted in the channel by the pusher 12 and in so doing advances the package previously inserted further into the channel. This sequence continues until all the channels in the drum are completely filled throughout their lengths. Thereafter, when the pusher 12 inserts a new package all the packages already in the same channel are displaced. This action serves to eject a package from the discharge end of the drum, this package then being received by the take-off table 7.

If desired, heaters or coolers can be arranged inside the drum and the temperatures of the pressure members can be automatically controllable.

If desired, the apparatus can be modified so that the drum 1 is continuously rotatable instead of intermittently rotatable. In another modification, the drum is not supported on the shaft 2, but is supported on small rollers which bear on the outer surface of the drum. Some or all of these small rollers are driven by any suitable mechanism thereby to rotate the drum intermittently or continuously as desired.

What I claim is:
1. An apparatus for setting seals on cartons and other packages which comprises:
  (a) a rotatable conveyor;
  (b) a plurality of setting chambers each chamber being defined by a top and bottom and two side walls, each chamber being spaced from each other chamber and being disposed around the axis of rotation of said conveyor;
  (c) means for advancing said cartons and packages into and through said chambers; and
  (d) pressure members disposed within each of said chambers for applying pressure to the seals to be set during the traversement of the chamber by the cartons and packages.
2. An apparatus according to claim 1 wherein:
  (a) said conveyor is a cylindrical drum; and further comprising,
  (b) means for rotating said drum intermittently.
3. An apparatus according to claim 2 wherein said pressure members comprise:
  (a) pressure plates;

(b) levers on which said plates are mounted; and
(c) springs acting on said levers to urge said plates in a direction to apply pressure to said seals to be set.

References Cited by the Examiner
UNITED STATES PATENTS

| | | | |
|---|---|---|---|
| 2,646,837 | 7/1953 | Brandenburg et al. | 156—381 |
| 2,670,027 | 2/1954 | Gigler | 100—93 |
| 3,094,396 | 6/1963 | Flugge et al. | 34—13 |
| 3,121,039 | 2/1964 | Rowland | 156—381 |
| 3,125,842 | 3/1964 | Ferguson | 53—387 |
| 3,133,798 | 5/1964 | Feld et al. | 34—187 |
| 3,145,518 | 8/1964 | Ricca | 53—387 |

EARL M. BERGERT, *Primary Examiner.*

HAROLD ANSHER, ALEXANDER WYMAN,
*Examiners.*